(12) United States Patent
Easter

(10) Patent No.: US 7,666,503 B2
(45) Date of Patent: Feb. 23, 2010

(54) SELF-HEALING CABLES

(75) Inventor: Mark R. Easter, Indianapolis, IN (US)

(73) Assignee: General Cable Technologies Corporation, Highland Heights, KY (US)

(*) Notice: Subject to any disclaimer, the term of this patent is extended or adjusted under 35 U.S.C. 154(b) by 0 days.

(21) Appl. No.: 11/043,987

(22) Filed: Jan. 28, 2005

(65) Prior Publication Data

US 2005/0136257 A1 Jun. 23, 2005

Related U.S. Application Data

(63) Continuation of application No. 10/702,454, filed on Nov. 7, 2003, now abandoned, which is a continuation of application No. 10/256,165, filed on Sep. 27, 2002, now abandoned, which is a continuation of application No. 09/923,436, filed on Aug. 8, 2001, now abandoned, application No. 11/043,987, which is a continuation of application No. 10/635,581, filed on Aug. 7, 2003, now abandoned.

(51) Int. Cl.
*B32B 15/00* (2006.01)

(52) U.S. Cl. .................. 428/379; 428/372; 428/375; 174/118; 174/110 R

(58) Field of Classification Search ............. 174/23 R, 174/23 C, 25 R, 110 R, 102 SC; 428/379, 428/372

See application file for complete search history.

(56) References Cited

U.S. PATENT DOCUMENTS

| | | | |
|---|---|---|---|
| 2,956,019 A * | 10/1960 | Sand et. al. ............... 508/144 |
| 4,668,724 A * | 5/1987 | Harriett ..................... 524/108 |
| 4,703,132 A | 10/1987 | Marciano-Agostinelli et al. |
| 4,708,975 A * | 11/1987 | Shain ......................... 523/216 |
| 4,963,695 A | 10/1990 | Marciano-Agostinelli et al. |
| 5,010,209 A * | 4/1991 | Marciano-Agostinelli et al. ........................ 174/23 C |
| 5,218,011 A * | 6/1993 | Freeman ..................... 523/173 |
| 5,373,100 A | 12/1994 | Arroyo et al. |
| 5,663,230 A * | 9/1997 | Haman ....................... 524/447 |
| 5,998,492 A | 12/1999 | Haar et al. |
| 6,184,473 B1 | 2/2001 | Reece et al. |
| 6,215,070 B1 | 4/2001 | King |
| 6,331,353 B1 | 12/2001 | Foulger |
| 6,455,769 B1 * | 9/2002 | Belli et al. ................ 174/23 C |
| 6,750,282 B1 * | 6/2004 | Schall et al. ............... 524/445 |
| 2001/0009198 A1 | 7/2001 | Belli et al. |
| 2004/0086707 A1 * | 5/2004 | Saita et al. .................. 428/327 |

FOREIGN PATENT DOCUMENTS

| | | |
|---|---|---|
| DE | 1590985 | 6/1970 |
| EP | 0 940 819 A1 | 9/1999 |
| EP | 1 081 720 A1 | 3/2001 |
| JP | 56-33032 | 4/1981 |
| WO | WO 01/46965 A1 | 6/2001 |

* cited by examiner

*Primary Examiner*—Jill Gray
(74) *Attorney, Agent, or Firm*—Blank Rome LLP

(57) ABSTRACT

A self-healing cable comprising a conductor and a water-swellable composition surrounding said conductor is disclosed. When the cable is damaged and water ingress reaches the water-swellable composition, the water-swellable composition expands and fills in any void, puncture or crack present, thus sealing the damage in the cable.

In one embodiment, the water-swellable composition is formed from an admixture of a substantially non-water-swellable polymer and a water-swellable filler.

In another embodiment, the water-swellable composition is formed from a water-swellable polymer.

3 Claims, 5 Drawing Sheets

SELF-HEALING CABLES

This application is a continuation of application Ser. No. 10/702,454, filed Nov. 7, 2003 now abandoned; which is a continuation of application Ser. No. 10/256,165, filed Sep. 27, 2002, now abandoned; which is a continuation of a continuation-in-part of application Ser. No. 09/923,436, filed Aug. 8, 2001, now abandoned. This application is also a continuation of application Ser. No. 10/635,581, filed Aug. 7, 2003 now abandoned; which is a continuation of Ser. No. 09/923,436, filed Aug. 8, 2001, now abandoned.

FIELD OF THE INVENTION

The present invention provides an improved, low cost cable that is capable of self-healing. By covering the conductor with a water-swellable material, damage to the cable is remedied due to the expanding action of the water-swellable material, thus sealing the damage in the cable.

BACKGROUND OF THE INVENTION

Cables with stranded or solid conductors coated with polymeric insulation have been used for many years. These cables are used for power transmission or distribution, telecommunications, and video and data transmission. The conductors of these cables may be made of aluminum or copper, with aluminum being prevalent in most cases due to lighter weigh and lower cost.

The cable construction may also include jacketing, metal sheaths, or shields and metal armors over the polymeric insulation to seal out moisture and prevent damage to the insulation. Common 600 V electrical distribution cables may include a stronger, tougher outer insulation layer, but usually do not include a metal sheath or armor. All these cables may be subjected to damage during or after installation, especially when directly buried, installed in tunnels, or inside buried pipes, from cutting by sharp tools, accidental dig in with shovels and picks, backfill with sharp rocks, and the like. The damage can be partial or total rupture of the outer sheath and possibly also of the insulating layer, with consequent infiltration of moisture and generation of leakage current. Further, if the rupture of the coating layers reaches the conductor, the combined effect of leakage current and moisture lead to a gradual corrosion of the conductor until complete breakage of the conductor occurs.

Aluminum conductors are most susceptible to rapid corrosion due to leakage currents. As oxides build up on the conductor, the diameter increases and the damage in the insulation is widened or opened, causing more water ingress. Eventually, the wires in the conductor corrode until few are left to carry a current, resulting in a cable failure.

To obtain effective protection against mechanical abuses, the cable can be provided with an outer structure capable of withstanding both cutting and compression. This outer structure comprises a sheath made of a metal or of a plastic material combined with metal armoring. Besides being expensive, this solution leads to a considerable increase in cable dimension and rigidity, thus making this solution unsuitable for cable which require easiness of installation and low cost, such as low-voltage cables.

Patent application DE 1,590,985 discloses a telecommunication or high-voltage cable which is protected from mechanical damage by means of an outer sheath having on its interior, micro-capsules containing a liquid which is capable of solidifying rapidly once the micro-capsule is broken. The solidifying material from the broken micro-capsule closes the accidental cut. A disadvantage is the high cost of introducing a large amount of micro-capsules into the sheath extrusion process. Further, during the various stages of a cable's life (manufacturing, storage, installation, use) the coating layers are inevitably subjected to compression, bending, and thermal cycles, which can lead to rupture of the micro-capsules. Therefore, when the cable is actually damaged, the micro-capsules are not available to effect the self-healing.

U.S. Pat. No. 6,184,473 discloses a cable with a self-sealing agent that is a flowable, low molecular weight polymer that is pumpable and flowable at 25° C. inside the stand and over the surface of the conductor. The disadvantage is that the material could flow out of the conductor when it is heated by high current during peak demand or by an electrical short circuit. The conductor also may also move toward one side of the insulation wall and force all the sealant to the opposite side, eliminating the self-healing protection in the area toward which the conductor moved.

EP 0 940 819 A1 discloses a cable with a self repairing agent that has controlled flowability that is under pressure due to the extrusion of the insulation over it. The disadvantage is that if there are several damages in a small area, the pressure will dissipates and all of the damage areas may not be repaired. Further, the flowable material also has the same disadvantages as that disclosed in U.S. Pat. No. 6,184,473 discussed above.

EP 1 081 720 A1 discloses a cable with a self-healing agent as in EP 0 940 819 A1 that has controlled flowability under pressure due to the extrusion of insulation over it. The self-healing agent is contained in channels in the insulation, and the insulation has anchoring portions on the conductor. The disadvantage of this solution is that there is less sealant in the anchoring portions and thus damages at the anchoring portions may not be properly sealed. The sealant may also flow inside the channels due to external pressure leaving voids in some areas next to the insulation, which could cause an electrical discharge with out an optional coating over the insulation. The material can also flow out of the conductor as in U.S. Pat. No. 6,184,473 discussed above.

WO 01/46965 A1; U.S. Pat. No. 4,703,132; and U.S. Pat. No. 5,010,209, each discloses a cable comprising water-swellable material in the coating for resisting the ingress of water to the conductor. The water-swellable material is applied either as a powder or as a mixture of a polymeric compound and a water-swellable powder. The major disadvantage of this system is the high cost of incorporating a water-swellable power into the cable coating.

Despite recent advances, there remains a need for a low cost cable that is capable of self-healing. Damages in the cable should be sealed before extensive corrosion occurs in the conductor. Furthermore, the cable should be constructed at a low cost, with a minimum of additional processing equipment. The instant invention provides such a cable and more.

SUMMARY OF THE INVENTION

The instant invention relates a self-healing cable comprising a conductor and a water-swellable composition surrounding said conductor. When the cable is damaged and water ingress reached the water-swellable composition, the water-swellable composition expands and fills in any void, puncture or crack present, thus sealing the damage in the cable.

In an embodiment of the invention, the water-swellable composition is formed from an admixture of a substantially non-water-swellable polymer and a water-swellable filler.

In another embodiment of the invention, the swellable composition is formed from a water-swellable polymer.

Additionally, the invention also relates methods of making the cable in accordance with the above embodiments.

DETAILED DESCRIPTION OF THE INVENTION

Figure 5:
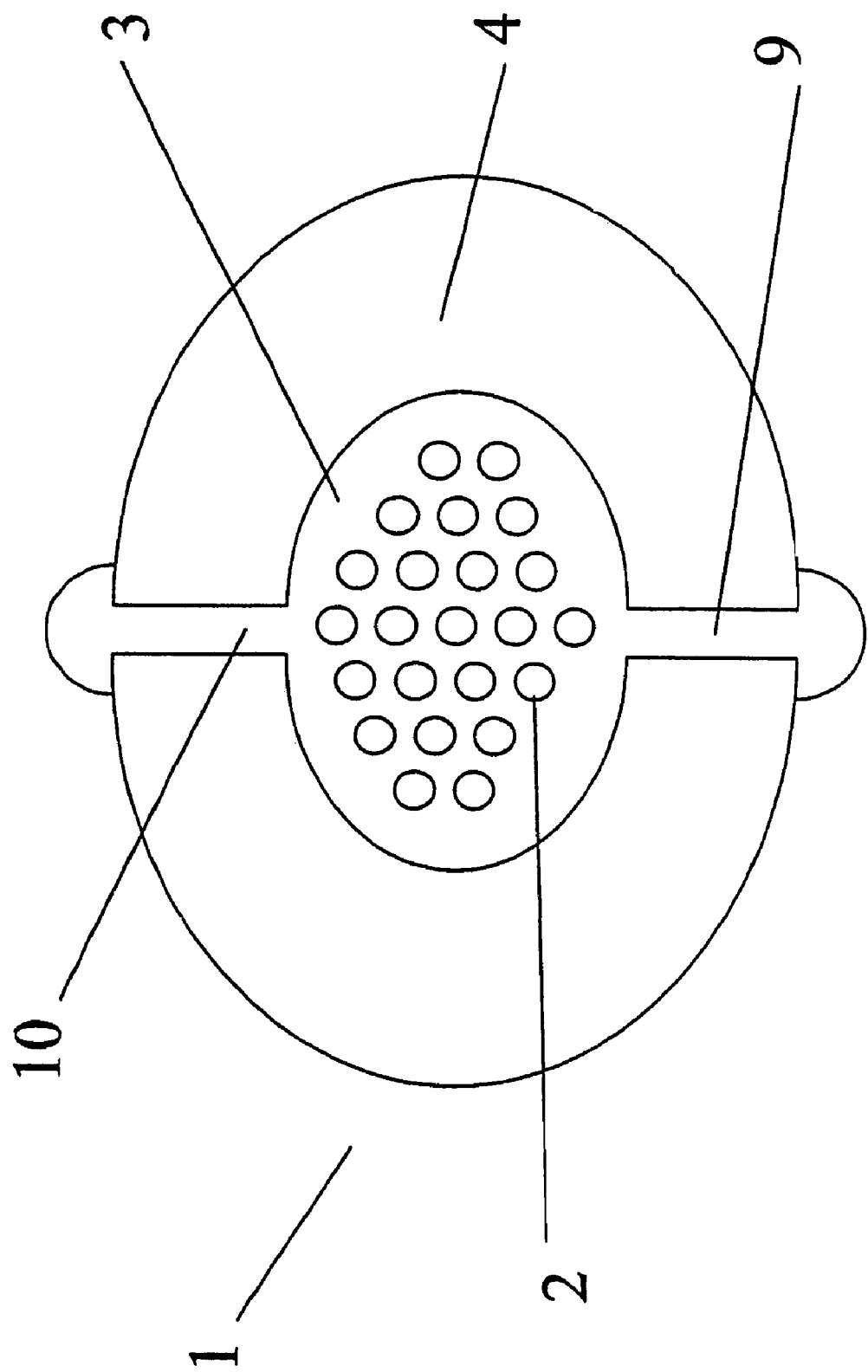
FIG. 5 shows a cable having two breaks sealed by the swelling of the water-swellable material.

The instant invention relates a self-healing cable comprising a conductor and a water-swellable composition surrounding said conductor. When the cable is damaged and water ingress reached the water-swellable composition, the water-swellable composition expands and fills in any void, puncture or crack present, thus sealing the damage in the cable. FIG. 5 shows a cable with two breaks (9 and 10) in the insulator (4). The expansion of the water-swellable material (3) due to water ingress fills the breaks (9 and 10) and restores the integrity of the cable.

The cable of the present invention comprises at least one strand of conductor and at least one layer of extruded polymeric insulation. The water-swellable material can be located in any one of many layers covering the cable.

Figure 1:
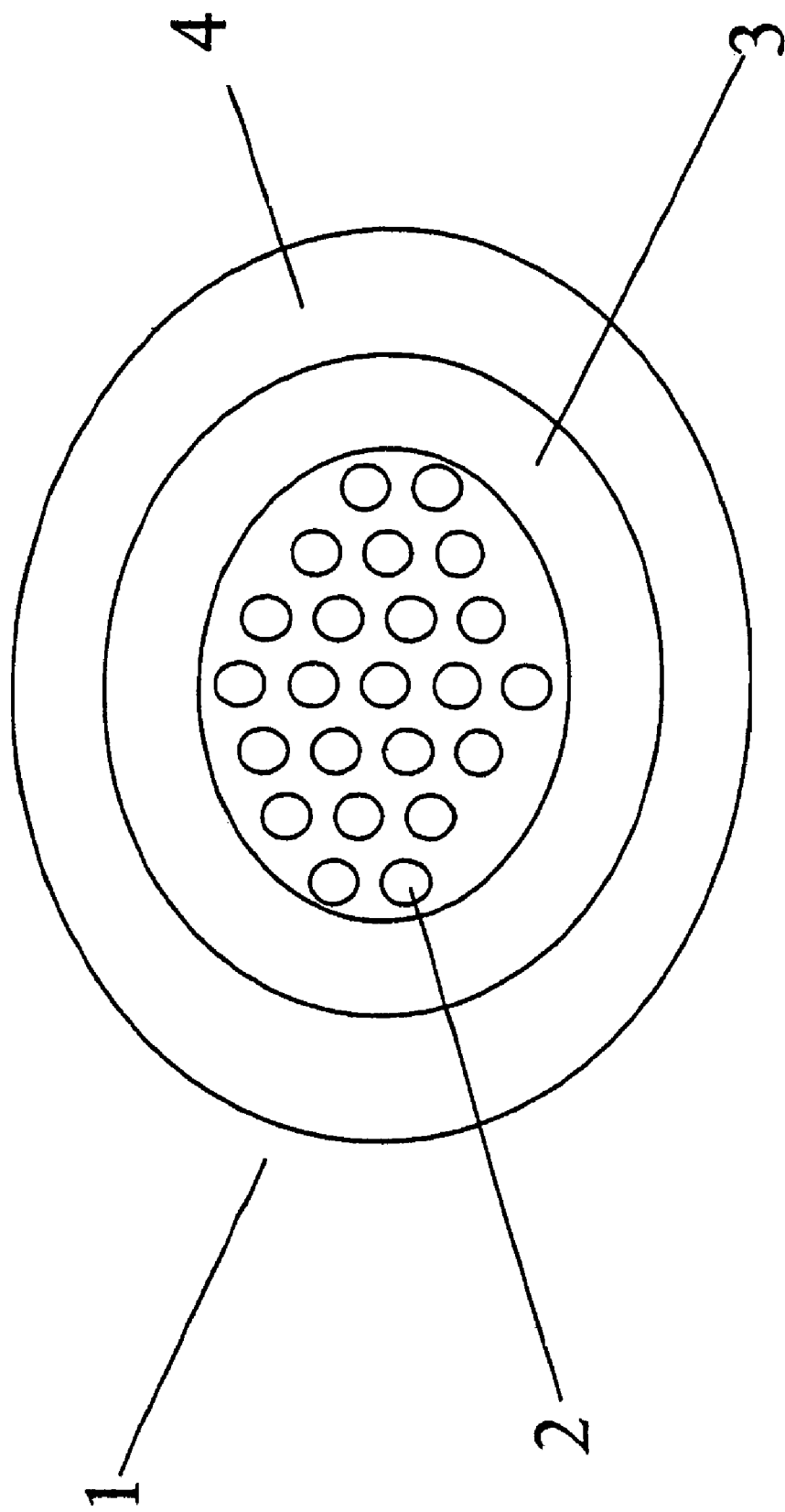
FIG. 1 shows an embodiment of the invention wherein the water-swellable material directly surrounds the conductor.

In one configuration, the water-swellable material is disposed between the conductor and the insulation. FIG. 1 shows a cable (1) comprising a conductor of stranded metal wires (2), a layer of water-swellable material that provides the self-healing effect (3), which completely covers the conductor and fills any spaces in between the outer layer of stranded wires and an insulation layer (4).

Figure 2:
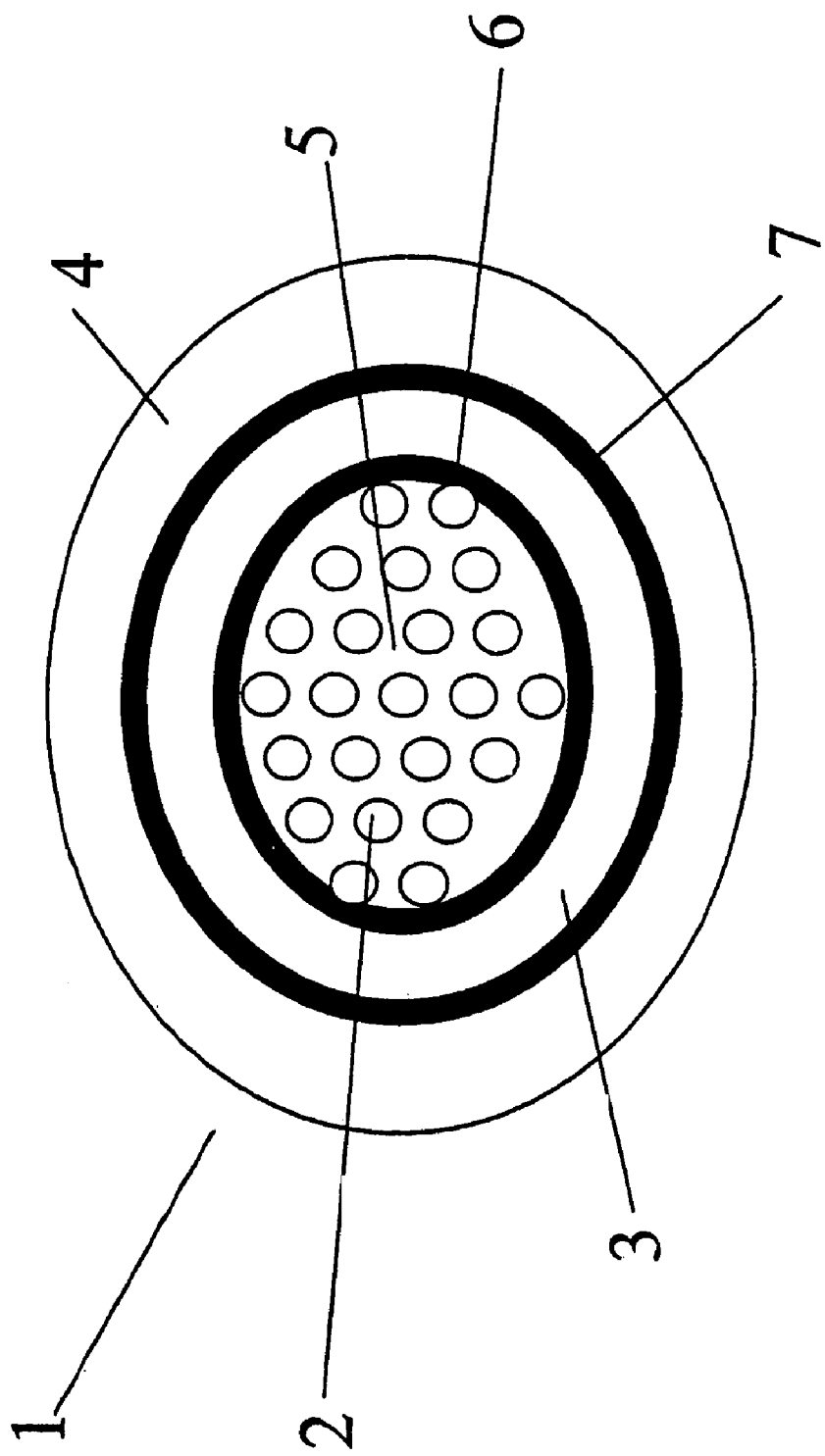
FIG. 2 shows an embodiment of the invention wherein the water-swellable material is contained between two polymeric sheets.

In a further configuration, the water-swellable material is extruded over the conductor and under the insulation. In this embodiment, a thin sheet of polymer, such as Mylar, may be placed over the conductor to prevent the material from sticking to the conductor. Another sheet of polymer may also be placed over water-swellable material to act as an additional water barrier and to prevent the material from sticking to the insulation extrusion tooling. FIG. 2 shows a cable (1) comprising a conductor of stranded wires (2) filled with a conductive sealant (5), a polymeric sheet (6) completely covering the conductor; a layer of water-swellable material that provides the self-healing effect (3), which completely covers the polymeric sheet; a second polymeric sheet (7) completely covering the water sellable material (3); and an insulation layer (4) covering the second polymeric sheet (7).

Figure 3:
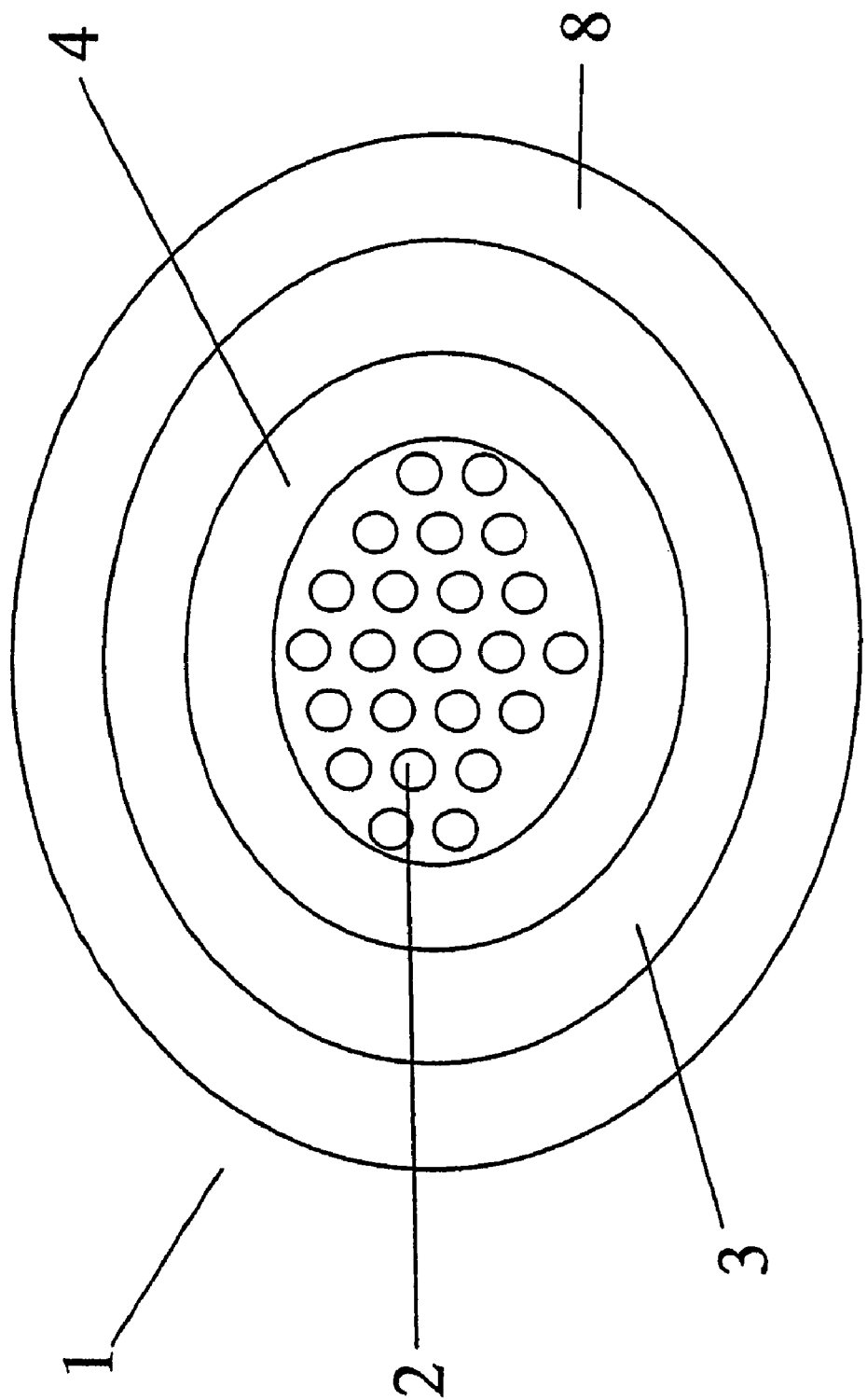
FIG. 3 show an embodiment of the invention wherein the water-swellable material is separated from the conductor by an insulator.

In a further configuration, the water-swellable material is disposed outside, of an insulation layer. FIG. 3 shows a cable (1) comprising a conductor of stranded wires (2); an insulation (4) completely covering the conductor; a layer of water-swellable material that provides the self-healing effect (3), which completely covers the insulation; and a second insulation layer (8) completely covering the layer of water-swellable material (3).

Figure 4:
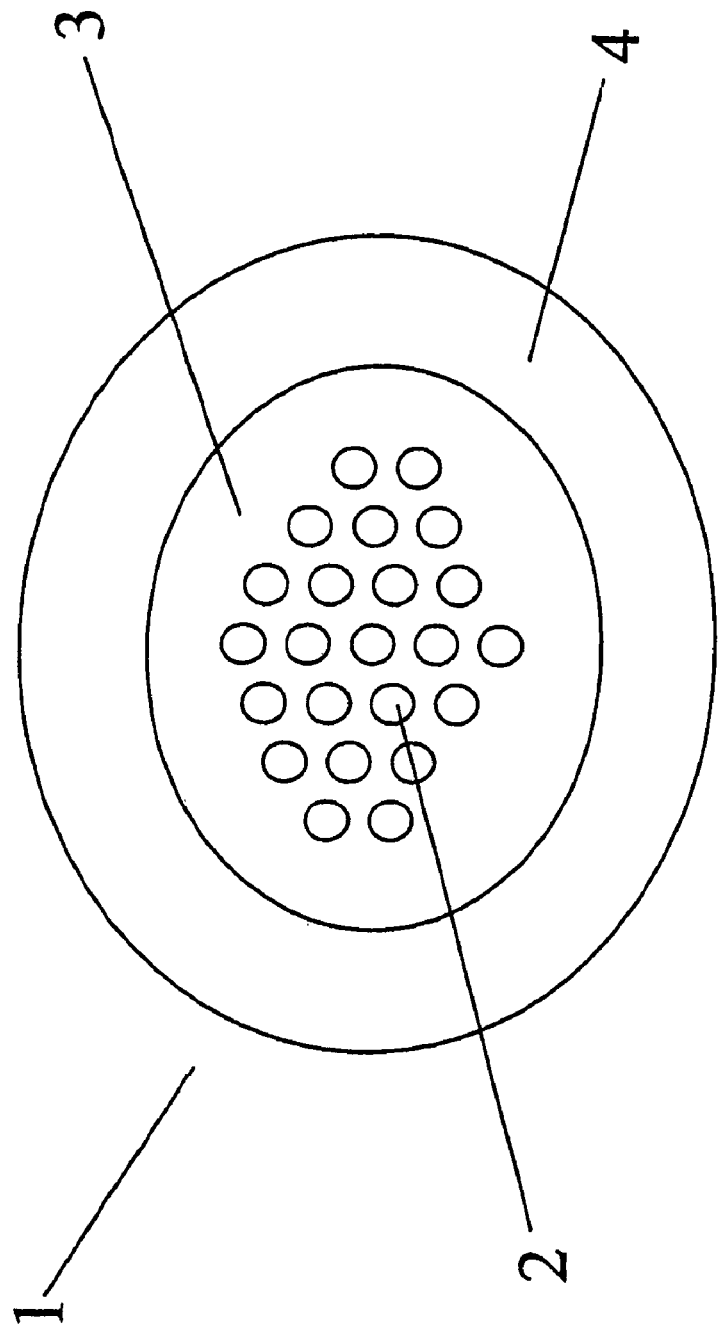
FIG. 4 shows an embodiment of the invention wherein the water-swellable material directly surrounds the conductor and fills the interstices between the wires of the conductor.

In a further configuration, the water-swellable material is disposed between the conductor and the insulation and in the interstices between the wires of the conductor. FIG. 4 shows a cable (1) comprising a conductor of stranded metal wires (2), a layer of water-swellable material that provides the self-healing effect (3), which completely covers the conductor and fills any spaces in between the stranded wires; and an insulation layer completely covering the water-swellable material (4).

The water-swellable material (3) can be manufactured two ways: (A) the water-swellable material comprises a substantially non-water-swellable polymer or carrier and a water-swellable filler; and (B) the swellable material comprises a water-swellable polymer.

A. Polymer or Carrier and Water-Swellable Filler

In a first embodiment, the water-swellable material comprises a polymer or carrier and a water-swellable filler, with the water-swellable filler being the main ingredient that causes the swelling of the material when exposed to moisture. The polymer or carrier, on the other hand, contribute very little if any to the swelling of the material under moist environment. "Very little swelling" or "substantially non-water-swellable" is used herein to refer to a total swelling of less than about 5 percent when a material is in constant contact with water.

The polymer or carrier can be, but is not limited to, petroleum jelly, polyisobutene, isobutene, polyisoprene, natural terpolymers, copolymers of propylene with ethylene and/or C4 to C12 a-olefins or amorphous ethylene copolymers with unsaturated esters. Preferably, the total swelling of these polymer or carrier, by itself, under continuous water exposure is less than about 5%. Most preferably, polyisobutene, isobutene, and polyisoprene are used because of low material and processing cost.

The water-swellable filler can be, but is not limited to, bentonite, lignite, alumina trihydrate, barytes, calcium carbonate, chlorite, clays, pyrophyllite, talc, polyacrylic acid, polyacrylamide, sodium polyacrylate, cellulose esters, ethylene vinyl chloride, acrylic resins, alkyd resins, polyethylene oxide, collagens, gelatins, ethylene acrylic acid, and mixtures thereof. Of these fillers, sodium bentonite, polyethylene oxide, or mixtures thereof is most preferred.

Other fillers such as carbon black and silica, plasticizers such as oils, stabilizers, antioxidants, metal deactivators, tackifiers, and steric acid can also be added.

Usually, enough water-swellable fillers are incorporated to cause a total swelling of from about 5 percent to about 200 percent, preferably from about 15 percent to about 150 percent. Any less filler than these ranges may result in incomplete sealing of the damage area. And any more filler may result in rupture of the insulation due to uncontrolled swelling. At the prescribed ranges, quicker self-healing takes place, because the material absorbs moisture during and after manufacturing, and thus, is under pressure by being restrained by the insulation. The actual amount of swellable filler used is dependent on the type or combination of filler used. And the actual amount of swell desired is dependent on the thickness of the water-swellable material, i.e. a thinner layer would need to swell more. In general, a water-swellable layer should be from about 0.1 to about 3 mm thick, preferably from about 0.5 to about 1.5 mm thick.

Overall, the viscosity of the water-swellable material at 300° F. should be between about 3,000,000 cps to about 13,000,000 cps. If the viscosity is less than about 3,000,000, the material could flow out of the conductor when it is heated by high current, during peak demand or due to an electrical short circuit. On the other hand, if the viscosity is greater than about 13,000,000 cps, the material may be difficult to apply with conventional pumping equipment. Further, the material preferably has a needle penetration value greater than 100 tenths of a mm at 25° C.

In a preferred embodiment, the water-swellable material is manufactured by mixing from about 20 percent to 30 percent bentonite with polyisobutene with a molecular weight of from about 10,000 to about 11,700. This material swells about 20% when in constant contact with water. The bentonite may also be treated with a polyquaternary amine or other agent to increase swelling in the presence of moisture.

B. Water-Swellable Polymer

In a second embodiment, the water-swellable material comprises a water-swellable polymer. In this embodiment, the polymer is the main ingredient that causes the swelling of the material, not the filler. The main advantage of this embodiment is that the water-swellable polymer can be extruded directly on to the conductor.

The water-swellable polymer can be, but is not limited to, polyethylene vinyl chloride, polyacrylic resins, polyalkyd resins, polyethylene oxide, polyethylene acrylate, and combinations thereof Most preferable polymers are polyethylene oxides with a molecular weight of from about 100,000 to about 8,000,000, more preferable from about 100,000 to about 1,000,000, and ethylene acrylic acid with a melt index of from about 1 to about 500.

Fillers such as carbon black and silica, plasticizers such as oils, stabilizers, antioxidants, metal deactivators, tackifiers, and steric acid can also be added. These additives, however, do not contribute significantly to the swellability of the material.

Usually, a total swelling of from about 5 percent to about 200 percent, preferably from about 15 percent to about 150 percent, is most desirable. Any less than these ranges may result in incomplete sealing of the damage area. And anymore may result in rupture of the insulation due to uncontrolled swelling. At the prescribed ranges, quicker self-healing takes place, because the material absorbs moisture during and after manufacturing, and thus, is under pressure by being restrained by the insulation. In general, a water-swellable polymer layer should be from about 0.1 to about 5 mm thick, preferably from about 1 to about 3 mm thick.

The invention has been disclosed broadly and illustrated in reference to representative embodiments described above. Those skilled in the art will recognize that various modifications can be made to the present invention without departing from the spirit and scope thereof.

What is claimed is:

1. A self-healing cable comprising a conductor and an insulating water-swellable composition surrounding said conductor, said insulating water-swellable composition comprising:
   a) a substantially non-water-swellable polymer selected from the group consisting of polyisobutene, polybutene, isobutene and polyisoprene or mixtures thereof; and
   b) a water-swellable filler admixed to the polymer, wherein said water-swellable filler is selected from the group consisting of sodium bentonite, lignite, alumnia trihydrate, barytes, chlorite, ethylene vinyl chloride, alkyd resins, polyethylene oxide, collagens, gelatins, and ethylene acrylic acid; wherein said insulating water-swellable composition has a viscosity between about 3,000,000 cps to about 13,000,000 cps at 300° F. and expands to seal damage in the cable and restores the integrity of the cable.

2. A self-healing cable according to claim 1 wherein said insulating water swellable composition is from about 10 percent by weight to about 70 percent by weight of sodium bentonite.

3. A self-healing cable according to claim 1 wherein said insulating water swellable composition is from about 20 percent by weight to about 50 percent by weight of sodium bentonite.

* * * * *